(12) United States Patent
Le Besnerais

(10) Patent No.: US 8,772,990 B2
(45) Date of Patent: Jul. 8, 2014

(54) STATOR SYSTEM WITH A COOLING ARRANGEMENT

(75) Inventor: Jean Le Besnerais, Mons en Baroeul (FR)

(73) Assignee: Siemens Aktiengesellschaft, Munich (DE)

( * ) Notice: Subject to any disclaimer, the term of this patent is extended or adjusted under 35 U.S.C. 154(b) by 372 days.

(21) Appl. No.: 13/210,655

(22) Filed: Aug. 16, 2011

(65) Prior Publication Data

US 2012/0043837 A1 Feb. 23, 2012

(30) Foreign Application Priority Data

Aug. 20, 2010 (EP) .................................... 10173527

(51) Int. Cl.
| | | |
|---|---|---|
| *H02K 9/22* | (2006.01) | |
| *H02K 9/04* | (2006.01) | |
| *H02K 9/00* | (2006.01) | |
| *H02K 7/18* | (2006.01) | |
| *H02K 5/20* | (2006.01) | |

(52) U.S. Cl.
USPC .............................. 310/64; 310/60 A; 290/55

(58) Field of Classification Search
USPC ..................................................... 310/60, 64
See application file for complete search history.

(56) References Cited

U.S. PATENT DOCUMENTS

| | | | | |
|---|---|---|---|---|
| 1,700,840 | A | * | 2/1929 | Gay ................................. 310/52 |
| 4,642,493 | A | * | 2/1987 | Wallace .......................... 310/13 |
| 6,700,283 | B2 | * | 3/2004 | Kikuchi et al. ................ 310/214 |
| 6,731,028 | B2 | * | 5/2004 | Derleth et al. .................. 310/52 |
| 7,960,874 | B2 | * | 6/2011 | Oda et al. ................... 310/12.29 |

FOREIGN PATENT DOCUMENTS

| | | | | |
|---|---|---|---|---|
| DE | 1813190 | A1 | 9/1969 | |
| DE | 10122425 | A1 | 11/2002 | |
| GB | 2001481 | * | 1/1979 | ............... H02K 9/02 |
| JP | 2004-64993 | * | 2/2004 | ............... H02K 1/20 |

\* cited by examiner

*Primary Examiner* — Burton Mullins

(57) ABSTRACT

A stator system for a generator is provided. The stator system includes a housing element, a conductor, a cooling box and a cooling arrangement. The conductor forms at least one winding of the stator system. The winding includes two central sections and an end section. The end section connects the two central sections, wherein each of the two central sections are mounted at a surface of the housing element. The end section projects from the housing element. The cooling box is mounted to the housing element in such a way that the cooling box encloses the end section, so that the end section runs inside an interior space of the cooling box. The cooling arrangement is located in and/or at the cooling box, wherein the cooling arrangement is adapted for cooling the end section.

12 Claims, 2 Drawing Sheets

STATOR SYSTEM WITH A COOLING ARRANGEMENT

CROSS REFERENCE TO RELATED APPLICATIONS

This application claims priority of European Patent Office application No. 10173527.2 EP filed Aug. 20, 2010, which is incorporated by reference herein in its entirety.

FIELD OF INVENTION

The present invention relates to a stator system for a generator, in particular a generator of a wind turbine, and a method of producing a stator system for a generator.

ART BACKGROUND

In generators for wind turbines, heat is generated when transferring mechanical energy in electrical energy. The heat is generated in the copper conductors that form the windings of the stator e.g. by Joule losses. The generated heat has to be removed in order to avoid hotspots and insulation wearing.

The stator housing and the attached windings are generally cooled by blowing air inside the stator. In axial end sections of the stator housings the windings protrude and from a half loop. The protruding half loops of the windings form the end windings of the stator windings. The stator windings are cooled by blowing air through the windings, for example in an air gap between rotor and stator or through radial extending ducts of the stator housing. It is also known to attach cooling pipes or hollow copper strains to the stator housing in order to provide a liquid cooling. The conductor sections of the windings that are attached to the stator housing are thereby cooled, but the protruding end windings are only cooled with a lesser efficiency, so that hotspots at the end windings may occur and may lead to damages of the stator winding.

SUMMARY OF THE INVENTION

It is an object of the present invention to provide a proper cooling for end windings of a stator.

This object is solved by a stator system for a generator, in particular a generator of a wind turbine and by a method of producing a stator system for a generator according to the independent claims.

According to a first aspect of the present invention, a stator system for a generator, in particular a generator of a wind turbine, is presented. The stator system comprises a housing element, a conductor, a cooling box and a cooling arrangement. The conductor forms at least one winding of the stator system, wherein the winding comprises two central sections and an end section. The end section connects the two central sections. Each of the two central sections is mounted at the surface of the housing element, wherein the end section projects from the housing element. The cooling box is mounted to the housing element in such a way that the cooling box incloses the end section, so that the end section runs inside an interior space of the cooling box. The cooling arrangement is located in and/or at the cooling box, wherein the cooling arrangement is adapted for cooling the end section.

According to a further aspect of the present invention, a method of producing a stator system for a generator is presented. At least one winding for a stator is formed with a conductor, wherein the winding comprises two central sections and an end section. The end section connects the two central sections. The two central sections are mounted at a surface of a housing element, wherein the end section projects from the housing element. The cooling box is mounted to the housing element in such a way that the cooling box incloses the end section, so that the end section runs inside an interior space of the cooling box. The cooling arrangement is provided, which is located in and/or at the cooling box, wherein the cooling arrangement is adapted for cooling the end section.

The housing element forms an individual section or a complete housing of a stator. If the housing element is only a section of the stator housing, a plurality of housing elements may be attached to one another in order to form the stator housing, i.e. the stator stack.

The windings of the stator are in general attached to the inner or outer surface of a housing element. For example, the windings may be attached to slots running generally in an axial direction of the rotary axis of a rotor of the stator system.

In axial direction (with respect to a rotary axis of the rotor of the stator system) of the housing element, the conductor protrudes from the housing element, runs further with a half loop and enters again the housing element. The protruding section forming the half loop of the conductor is called "end section" of the conductor. The end section of the conductor is generally not in physical contact and/or generally not in thermal contact with the housing element.

The cooling box forms a closed box that is attached to the axial end faces of the housing element and thereby incloses the end section of the conductor. The end section may contact a wall of the cooling box or may run contactless inside the interior space of the cooling box.

The cooling arrangement is attached in thermal contact to the cooling box and located in and/or at the cooling box. The cooling arrangement comprises means or devices for generating a cooling energy in order to cool the end windings. The cooling arrangement may be a heat transferring wall that transfers cooling energy from a cooling system of the stator housing to the inside of the interior space of the cooling box.

Furthermore, the cooling arrangement may comprise for example a fan, cooling pipes for providing a liquid cooling or a Peltier cooling element for providing an electrical cooling. Moreover, the cooling arrangement may also comprise a compressor for compressing a cooling medium for generating cooling energy.

For example, inside the cooling box, a cooling medium may circulate inside the interior space for cooling the end section of the winding. The cooling medium may be for example a liquid fluid, such as oil, or a gaseous fluid, such as air.

According to a further exemplary embodiment, the cooling arrangement comprises the above mentioned fan for generating a circulation of the cooling medium (e.g. air or other gaseous or liquid cooling fluids) in the interior space. By generating a circulation with the fan, the convection of the heat from the end windings is improved and thus the general cooling efficiency of the cooling arrangement. Moreover, the cooling box may comprise air inlets and air outlets, so that e.g. fresh air may be sucked into the air inlet inside the interior space and heated air that is heated up by the end windings may be exhausted through the air outlet.

According to a further exemplary embodiment, the cooling box comprises a wall to which a cooling pipe, through which a cooling medium is flowable, is mounted. The cooling pipe is mounted to the wall in such a way that the cooling pipe is in thermal contact with the interior space for cooling the end section of the winding.

If the end windings are in physical contact with the wall of the cooling box, the cooling pipes of the cooling arrangement directly cool the end windings. If the end windings are contactless with a wall of the cooling box, the further cooling medium in the cooling pipes cools the cooling medium, such as air, inside the interior space of the cooling box, wherein the cooling medium cools finally the end windings. In a preferred exemplary embodiment the cooling box comprises the cooling arrangement with the fan for generating a circulation of the cooling medium and with the cooling pipe for cooling directly or indirectly the end windings with the further cooling medium.

According to a further exemplary embodiment, the wall of the cooling box comprises slots, within the cooling pipe of the cooling arrangement is arranged. If the cooling pipe is arranged within the slots, the contact area between the cooling pipes and the wall is increased, because a physical contact between the cooling pipe and the base area of the slots as well as the sidewalls of the slots are in physical contact with the cooling pipe, so that a better heat transfer is generated. Thus, the cooling efficiency is improved.

According to a further exemplary embodiment, the housing element comprises a base plate with further slots, in which further cooling pipes are arranged. The further cooling pipes are in thermal contact with the two central sections of the winding.

According to a further exemplary embodiment, the cooling pipe is coupled to the further cooling pipe in such a way that the further cooling medium is flowable between the cooling pipe and the further cooling pipe, such that a common cooling circuit is generated. By the exemplary embodiment, a cooling control for the central sections of the windings may also applied to the cooling pipes of the cooling arrangement in the cooling box, so that an easier cooling control also for the end windings may be achieved. Moreover, there is no need to install two separate cooling circuits, so that a simpler system is achieved.

On the other side, it may be alternatively beneficial to provide two separate cooling circuits, one for cooling the housing element, in particular the central sections of the windings, and one separate cooling circuit running through the cooling arrangement of the cooling box for cooling the end sections of the windings. Thus, the cooling energy for the central sections and for the end sections of the windings may be controlled independently. Thus, a more exact cooling of the winding sections is possible. This may be beneficial, because the end windings, which protrude from the housing element and may run without a physical contact to the housing element comprise different heating characteristics in comparison to the central sections of the windings that are in physical contact with the surface of the housing element. Additionally, thermal stress that is caused by temperature differences between the central section and the end section may be reduced by a more exact cooling.

According to a further exemplary embodiment, the cooling box comprises a material with a thermal conductivity of more than approximately 100 W/(m·K), more than approximately 150 W/(m·K) or more than approximately 200 W/(m·K). The higher the thermal conductivity of the material of the cooling box the better the heat conduction from the cooling box to the cooling system of the stator housing, so that a better cooling efficiency is achieved. In a preferred embodiment, the material of the cooling box may be made at least partially of aluminium or of aluminium alloys.

The above described invention provides a proper cooling system for the windings of a stator system. For example, the (liquid) cooling system of the stator housing (stator lamination) that is used for cooling the central sections of the windings, may be extended to the end windings. The end sections (end windings) are placed inside a closed cooling box that is made of a high thermal conductivity material, such as aluminium. Cooling pipes inside the cooling box may be connected to further cooling pipes of the housing element, so that a coupling to the stator liquid cooling system is achieved. Additionally, fans may blow air in the interior space of the cooling box, in particular in circumferential direction of the cooling box which is oriented around a central axis of the stator. The cooling box may be closed or may comprise air inlets or outlets.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
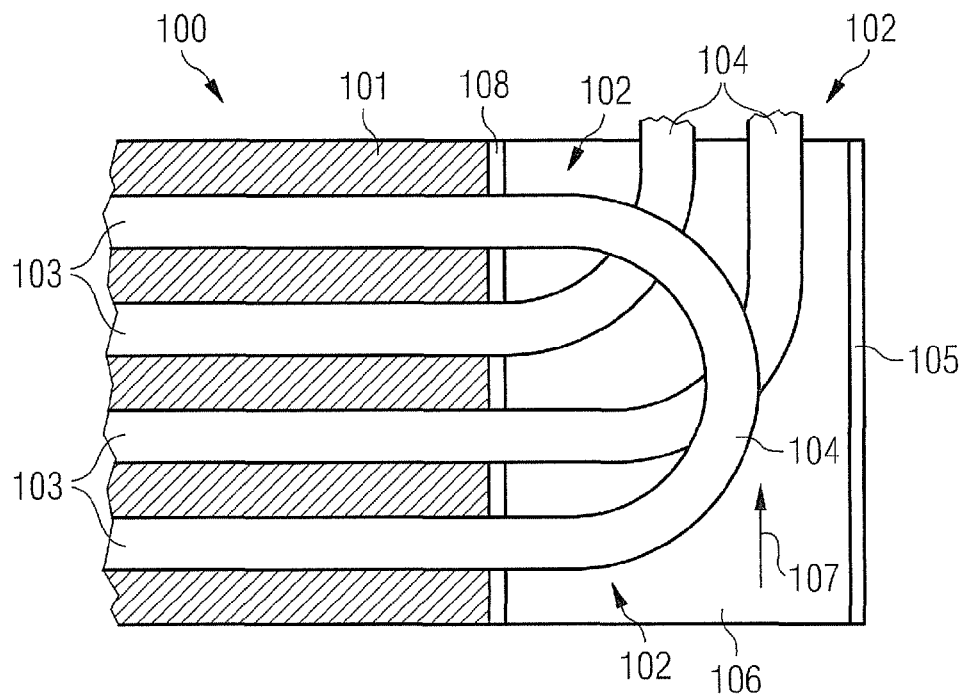
FIG. 1 shows a schematical view of the stator system comprising the cooling box according to an exemplary embodiment of the present invention.

The illustrations in the drawings are schematical. It is noted that in different figures, similar or identical elements are provided with the same reference signs.

FIG. 1 shows a stator system 100 for a generator, in particular for a generator of a wind turbine. The stator system 100 comprises a housing element 101, a conductor 102, a cooling box 105 and a cooling arrangement. The conductor 102 forms at least one winding of the stator system, wherein the winding comprises two central sections 103 and an end section 104. The end section 104 connects the two central sections 103. Each of the two central sections 103 are mounted at a surface of the housing element 101, wherein the end section 104 projects from the housing element 101. The cooling box 105 is mounted to the housing element 101 in such a way that the cooling box 105 incloses the end section 104, so that the end section runs inside an interior space 106 of the cooling box 105. The cooling arrangement is located in and/or at the cooling box 105, wherein the cooling arrangement is adapted for cooling the end sections 104.

In the interior space 106 of the cooling box 105 a cooling medium 107 may circulate for cooling the end sections 104 of the winding.

In FIG. 1, three windings are schematically shown. Each winding comprises two central sections 103 that are attached at a surface of the housing element 101. In FIG. 1, one winding is shown, wherein the end section 104 connects the two central sections 103 of the winding. In axial direction with respect to a rotating axis 201 (see in FIG. 2) of the rotor of the stator system (not shown) the housing element 101 comprises an end face, to which a fingerplate 108 is attached. The fingerplate comprises teeth, through which the windings run. As can be taken from FIG. 1, the central sections 103 are in physical contact with the surface of the housing element 101, wherein behind the fingerplate 108 in axial direction, the conductor forming the winding protrudes and run with a half loop to a further central section 103 of the winding. The protruding part of the winding is the end section 104.

The cooling box 105 incloses the end windings 104. The cooling box 105 is attached to the housing element 101. In particular, the cooling box 105 is attached to the end face of the housing element 101 in the axial direction and is thus attached as well to the fingerplate 108. The cooling box 105 may form a duct that runs in circular direction with respect to the central axis 201 along the end face of the housing element 101.

Figure 2:
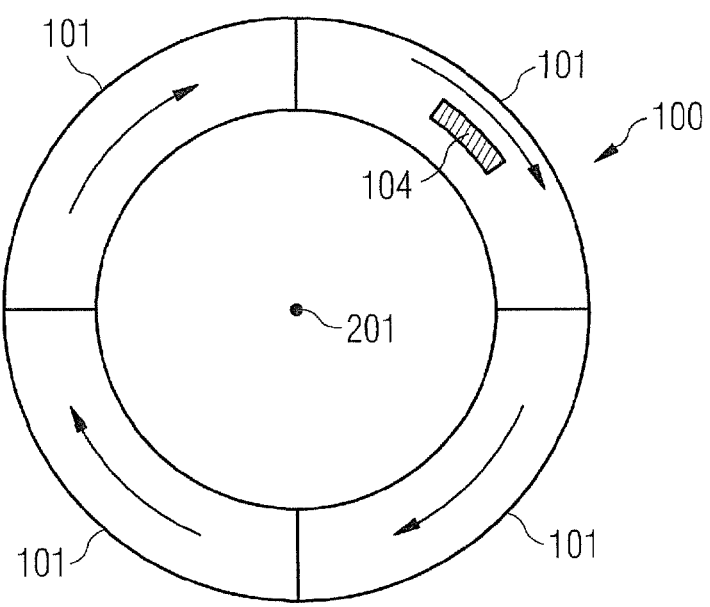
FIG. 2 shows a schematical view in axial direction to the end face of the housing elements.

FIG. 2 is a view along the central axis 201 of the stator system 100, wherein the central axis 201 is in particular the rotary axis of the rotor of the stator system 100. In circumferential direction with respect to the central axis 201, four housing elements 101 form the stator housing. Each housing element 101 is attached in circumferential direction to another. The cooling box 105 (not shown in FIG. 2) is attached to the end face of each housing element 101. The cooling box 105 may only extend in circumferential direction along an end face of one or more housing elements 101. In another exemplary embodiment, only one circular cooling box 105 may be attached to the end faces of each housing element 101, wherein the circular cooling box 105 forms a closed loop around the end faces of the housing elements 101.

Each cooling box 105 of each housing element 101 may be connected to the neighboring cooling box 105 in circumferential direction for forming a duct for a homogeneous circulation of the cooling medium along the end face of the housing element 101 and thus around the central axis 201. In a further exemplary embodiment each cooling box 105 may be isolated from the neighboring cooling box 105, so that each separate cooling box 105 is filled with a thermally isolated cooling medium 107 that flows inside the interior space 106 of each cooling box 105.

Figure 3:
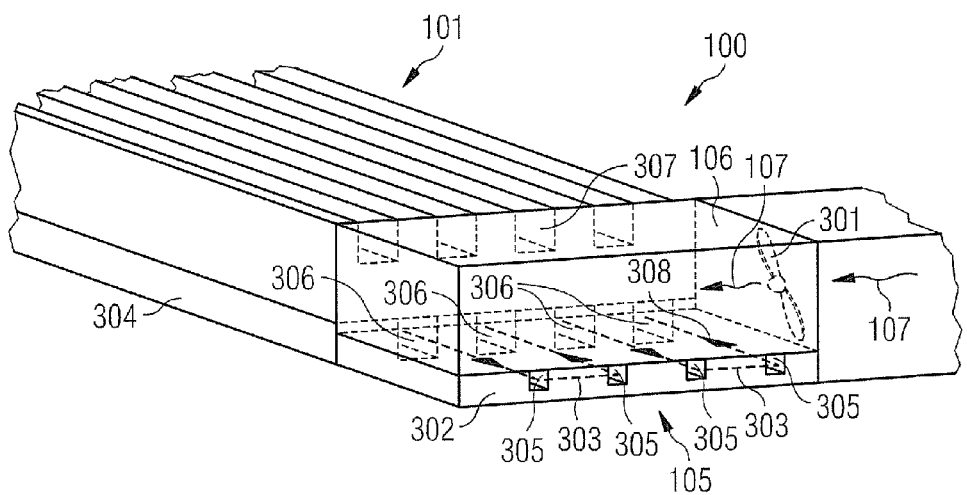
FIG. 3 shows a perspective view of a cooling box mounted to an end face of the housing element according to an exemplary embodiment of the present invention.

FIG. 3 shows a perspective view of the stator system 100, wherein several cooling arrangements are attached at and/or in the cooling box 105. Inside the interior space 106 of the cooling box 105 the cooling arrangement may comprise a fan 301 that is adapted for blowing the cooling medium 107, such as air, inside the interior space 107. The cooling medium 107 cools the end sections 104 of the stator windings. The windings are not shown in FIG. 3 for the sake of clarity.

The stator windings may be attached in particular to stator slots 307 running in axial direction with respect to the central axis 201 along the outer surface of the housing element 101.

For example, the conductor runs with its central sections 103 along the stator slot 307 of the housing element 101 and exits the stator slot 307 at the end face of the housing element.

After running in a half-loop, the conductor enters another e.g. adjacent stator slot 307 for forming the winding. In the half-loop section (end section 104), the conductor may be in physical contact with the in axial direction orientated face surface of the housing element 101 or may be contactless with the face surface.

Moreover, the cooling box 105 comprises a wall 302 into which ducts 305 are e.g. drilled for forming a cooling pipe 303 of the cooling arrangement. Into the cooling pipe 303 a further cooling medium 308 may circulate in order to cool the interior space 106 of the cooling box 105.

Moreover, FIG. 3 shows a base plate 304 of the housing element 101 into which further slots 306 are drilled for forming further cooling pipes. The further cooling pipes generate a circulation of cooling medium for cooling in particular the central sections 103 of the windings attached to the stator slots 307. The cooling pipes 303 of the cooling box 105 may be coupled to the further cooling pipes of the stator elements 101 in order to generate a common cooling circuit.

Figure 4:
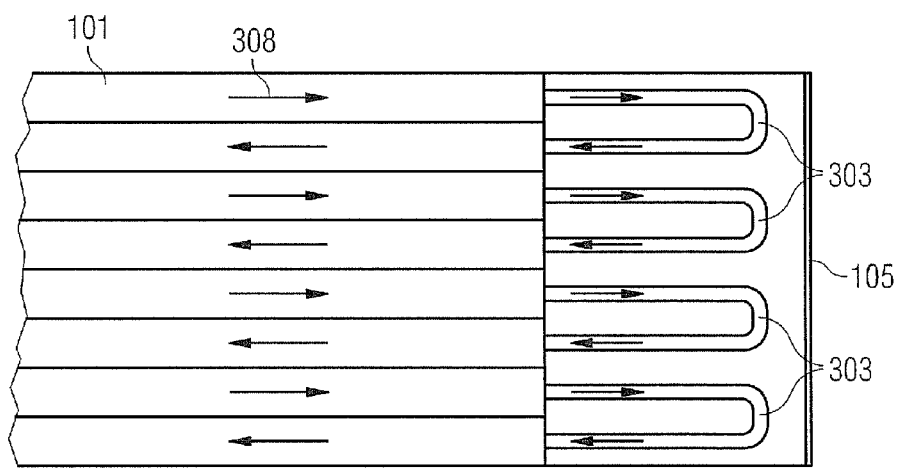
FIG. 4 shows a schematical view of a cooling circuit according to an exemplary embodiment of the present invention.

FIG. 4 illustrates such a common cooling circuit. The further cooling medium 308 flows along the further cooling pipes of the housing element 101 to the cooling pipe 303 of the cooling box 105. After cooling the end sections 104, the further cooling medium 308 flows back to the further cooling pipes of the housing element 101 and cools other central sections 103 of the winding. FIG. 4 illustrates a common cooling circuit. On the other side, it is also possible to provide two separate cooling circuits, one for the central sections 103 of the windings and one for the end sections 104 of the windings.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A stator system a generator of a wind turbine, the stator system, comprising:
   a housing element;
   a conductor that forms at least one winding of the stator system, wherein the winding comprises two central sections and an end section, wherein the end section connects the two central sections, wherein each of the two central sections are mounted at a surface of the housing element, wherein the end section projects from the housing element;
   a cooling box mounted to the housing element in such a way that the cooling box encloses the end section in an interior space of the cooling box; and
   wherein the housing element comprises a base plate with additional slots in which additional cooling pipes are arranged, and
   wherein the additional cooling pipes are in thermal contact with the two central sections of the winding.

2. The stator system of claim 1,
   wherein the cooling arrangement comprises a fan for generating a circulation of a first cooling medium in the interior space of the cooling box.

3. The stator system of claim 1,
   wherein the cooling box comprises a wall to which a cooling pipe of the cooling arrangement is mounted in such a way that the cooling pipe is in thermal contact with the interior space for cooling the end section of the winding, and
   wherein a second cooling medium flows through the cooling pipe.

4. The stator system of claim 3,
wherein the wall comprises slots in which the cooling pipe is arranged within.

5. The stator system of claim 1,
wherein the cooling box comprises a material with a thermal conductivity of more than 100 W/(m·K).

6. The stator system of claim 5,
wherein the material is aluminium.

7. The stator system of claim 1,
wherein the cooling arrangement is located in the cooling box.

8. A method of producing a stator system for a generator, the method comprising:
forming at least one winding for a stator with a conductor, wherein the winding comprises two central sections and an end section, wherein the end section connects the two central sections;
mounting the two central sections at a surface of a housing element, wherein the end section projects from the housing element;
mounting a cooling box to the housing element in such a way that the cooling box encloses the end section in an interior space of the cooling box; and
providing a cooling arrangement adapted for cooling the end section;
a cooling arrangement adapted for cooling the end section,
arranging additional cooling pipes in a base plate which is comprised by the housing element,
wherein the additional cooling pipes are in thermal contact with the two central sections of the winding.

9. The method of claim 8,
wherein the cooling arrangement comprises a fan for generating a circulation of a first cooling medium in the interior space of the cooling box.

10. The method of claim 8,
mounting the cooling arrangement to a wall of the cooling box such that the cooling pipe is in thermal contact with the interior space for cooling the end section of the winding, and
wherein a second cooling medium flows through the cooling pipe.

11. The method of claim 10,
wherein the wall comprises slots in which the cooling pipe is arranged within.

12. The method of claim 10,
wherein the cooling arrangement is located in the cooling box.

* * * * *